United States Patent
Tsukada et al.

(12) 
(10) Patent No.: US 6,636,461 B2
(45) Date of Patent: Oct. 21, 2003

(54) RECORDING AND/OR REPRODUCING METHOD AND APPARATUS HAVING RECIPROCAL TIME DOMAIN TO BINARY CONVERSION MEANS

(75) Inventors: Futoshi Tsukada, Kanagawa (JP); Tetsuji Kawashima, Kanagawa (JP); Michihiko Iida, Kanagawa (JP)

(73) Assignee: Sony Corporation (JP)

( * ) Notice: Subject to any disclaimer, the term of this patent is extended or adjusted under 35 U.S.C. 154(b) by 214 days.

(21) Appl. No.: 09/887,036

(22) Filed: Jun. 25, 2001

(65) Prior Publication Data

US 2002/0041541 A1 Apr. 11, 2002

(30) Foreign Application Priority Data

Jun. 26, 2000 (JP) ........................................ 2000-191617

(51) Int. Cl.[7] .......................... G11B 21/08; G06F 12/00
(52) U.S. Cl. ................... 369/30.11; 369/59.25; 711/202; 711/4
(58) Field of Search ..................... 369/30.11, 59.23, 369/59.25, 59.26, 47.15, 47.21, 47.22; 341/85, 84, 95, 50; 711/202, 4; 714/8

(56) References Cited

U.S. PATENT DOCUMENTS

| | | | | |
|---|---|---|---|---|
| 6,223,247 | B1 * | 4/2001 | Otsuka et al. | 711/4 |
| 6,265,995 | B1 * | 7/2001 | Sahejpal et al. | 341/95 |
| 6,332,176 | B1 * | 12/2001 | Fang et al. | 711/113 |

FOREIGN PATENT DOCUMENTS

| | | | | |
|---|---|---|---|---|
| JP | 11-296968 | * | 10/1999 | 369/30.11 |
| KR | 2001-095388 A | * | 11/2001 | 369/30.11 |

\* cited by examiner

*Primary Examiner*—Tan Dinh
(74) *Attorney, Agent, or Firm*—Rader, Fishman & Grauer PLLC; Ronald P. Kananen

(57) ABSTRACT

A method and apparatus for information signals in which, in recording and/or reproducing information signals responsive to a request from a host device, a first address defined with the time domain information is converted into a second address defined with consecutive hexadecimal numbers and vice versa by way of reciprocal address conversion. Specifically, an uppermost order value in the time domain information in the first address and a second address value are converted reciprocally using a conversion table.

14 Claims, 9 Drawing Sheets

FIG.8

RECORDING AND/OR REPRODUCING METHOD AND APPARATUS HAVING RECIPROCAL TIME DOMAIN TO BINARY CONVERSION MEANS

BACKGROUND OF THE INVENTION

1. Field of the Invention

This invention relates to a recording and/or reproducing apparatus for recording and/or reproducing information along a recording track of a disc-shaped optical recording medium, and to a recording and/or reproducing method for recording and/or reproducing information signals along the recording track responsive to a request from a host apparatus.

2. Description of Related Art

In the present embodiment, an optical recording medium is provided with a signal recording layer and is in a disc shape. A light beam is illuminated on this signal recording layer to record and/or reproduce information signals.

Among these optical recording mediums, there is a replay-only optical disc in which a pit string corresponding to information for recording is formed at the outset on a disc substrate, such as a CD (Compact Disc) or a CD-ROM (CD-Read Only memory). In such replay-only optical disc, the major surface on the disc substrate, on which the pit string is formed, has the function of the signal recording layer.

An optical disc used for a s-called compact disc recordable system and which permits post-writing only once, referred to below as CD-R, is also put to practical application. In the CD-R, a signal recording layer, on which to record the information signals, is formed by a material of an organic dye based material. On illuminating a light beam on the signal recording layer, the portion illuminated is changed in reflectance to effect the recording. The reflectance of the signal recording layer is detected to reproduce the recorded signals.

As an optical recording medium, a phase change type optical disc which utilizes phase changes of the signal recording layer which enables rewriting of the information signals by exploiting phase changes of the signal recording layer, such as the CD-RW (CD-Rewritable), has also been put to practical use.

As for the optical discs, such as CD, CD-ROM, CD-R or CD-RW, a variety of design parameters are standardized in accordance with the standard termed CD-format. This allows to reproduce the CD-R or CD-RW, enabling post-writing only once or rewriting of information signals, even on an apparatus designed to reproduce a replay-only disc, such as CD or CD-ROM.

Meanwhile, in the CD-ROM, i.e., among the above-described various optical discs, a first address (physical address) defined as the time domain information, and a second address (logical address) defined as consecutive binary numbers, are used as the address information indicating the positions of the information signals recorded on the disc.

The first address, having three time units of minute (M), seconds (S) and frames (F) as its values, is termed an MSF value. The first address is recorded in the CD-ROM in a Q-channel in a sub-code recorded in a recording track. The second address is specified from a host device, such as a personal computer connected to outside the optical disc device by a logical address value, or a so-called LBA (logical block address).

If, in accessing specified recording data on an optical disc, an accessing position is specified by the second address from the host device, the optical disc converts this second address into the first address to access the optical disc. Thus, in an optical disc device, it becomes necessary to effect the processing of frequently converting the second address to the first address or vice versa by way of reciprocal address conversion.

In the conventional optical disc device, the following artifice is used in converting the LBA value as the second address into the MSF value as the first address: That is, a remainder obtained on dividing the LBA value by 75 is used as the value of a frame (F) in the first address. On the other hand, a quotient obtained by this calculation is further divided by 60 to give a second remainder which is used as the second (S) in the first address. The above quotient is used as the minute (M) in the first address.

In the above-described optical disc device, at least two division operations are required in converting the second address to the first address such that a lot of time is needed in carrying out the conversion processing. If this conversion processing is carried out not by employing a command for division in a CPU but by employing a bit shift command or by an addition command, the computing processing is complex and time-consuming. The result is that, in the conventional optical disc device, the response time in reading or writing data on or from an optical disc tends to be worsened.

Moreover, in developing a semiconductor chip, such as a decoder or encoder including the above-mentioned address conversion processing, the multiplying and dividing circuitry needs a large number of gates, resulting in a larger circuit scale, a high cost and an increased circuit space to lower the cost and size of the entire optical disc device.

Moreover, in the field of recording and/or reproduction, the upper limit values of the aforementioned LBA and MSF values tend to be increased in keeping pace with the tendency towards high recording density and capacity of the optical disc. Although it may be envisaged to introduce higher order values to the first address to cope with the increasing capacity of the optical disc, at least three division and multiplication operations are needed in the aforementioned address conversion processing, thus further protracting the processing time.

SUMMARY OF THE INVENTION

It is therefore an object of the present invention to provide a recording and/or reproducing method and apparatus, according to which the time involved in converting the first address defined in terms of the time domain information to the second address defined in terms of consecutive binary numbers and vice versa may be shortened, such that, even in case the capacity of the optical recording medium is increased, the address conversion processing may be executed efficiently.

The recording and/or reproducing apparatus according to the present invention records and/or reproduces information signals along a recording track and includes rotational driving means, recording and/or reproducing means, address conversion means and memory means. The rotationally driving means rotationally drives the optical recording medium at a pre-set speed. The recording and/or reproducing means is movable along the radius of the optical recording medium to record and/or reproduce the information signals on or from the recording track of the optical recording medium. The address converting means converts the first address in the optical recording medium as defined with the time domain information into the second address as defined with consecutive hexadecimal numbers. The memory means holds a conversion table for conversion of the uppermost order value of the time domain information in the first address to the second address value and vice versa. The address converting means reciprocally converts the first and second addresses using the conversion table held in the memory means.

In the recording and/or reproducing apparatus according to the present invention, the address conversion by the address conversion means takes place using the conversion table held by the memory means. Since the address conversion means is able to perform rough conversion, using the conversion table for conversion between the uppermost order value of the time domain information in the first address value and the second address value, the conversion processing can be performed efficiently for shortening the processing time.

The recording and/or reproducing method according to the present invention includes an address converting step and a recording and/or reproducing step in recording and/or reproducing information signals along a recording track of a disc-shaped optical recording medium. At the address converting step, the first address defined with the time domain information and the second address defined with consecutive hexadecimal numbers are converted reciprocally. At the recording and/or reproducing step, the information signals are recorded and/or reproduced on or from the optical recording medium using the address as converted at the address converting step. The address conversion at the address conversion step takes place using the conversion table for conversion between the uppermost order value in the time domain information in the first address and the value of the second address.

Since the address conversion means is able to perform rough conversion, using the conversion table for conversion between the uppermost order value of the time domain information in the first address and the second address value, the conversion processing can be performed efficiently for shortening the processing time.

In the recording and/or reproducing apparatus according to the present invention, address conversion by the address conversion means takes place using the conversion table held by the memory means. Since the address conversion means is able to effect rough conversion using a conversion table for reciprocal conversion between the uppermost order value in the time domain information and the second address value, it is possible to achieve efficient conversion processing to realize a shorter processing time. The result is that the response time in reading out or writing data on or from an optical recording medium may be shorter to realize high speed recording and/or reproduction.

On the other hand, since the number of the division or multiplication circuits can be reduced in case the address conversion processing is performed using a hardware such as semiconductor chip, the number of gates can be reduced. Even if the optical recording medium is increased in recording capacity, the address conversion may be made roughly using the uppermost order value of the first address, so that address conversion can be achieved efficiently and speedily.

According to the recording and/or reproducing method according to the present invention, in which the address conversion means is able to perform rough conversion, using the conversion table for conversion between the uppermost order value of the time domain information in the first address and the second address value, the conversion processing can be performed efficiently, with the processing time being shorter. So, even if the optical recording medium is increased in recording capacity, address conversion may be made roughly using the uppermost order value of the first address, so that address conversion can be achieved efficiently and speedily.

BRIEF DESCRIPTION OF THE DRAWINGS

FIG. 8 is a schematic view showing the structure of the sub-code in the CD-R.

DESCRIPTION OF THE PREFERRED EMBODIMENTS

Figure 1:
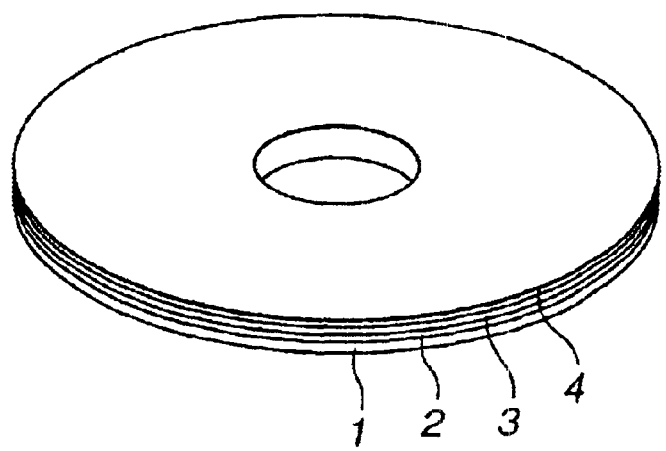
FIG. 1 is a schematic perspective view of a CD-R as an embodiment of an optical recording medium for recording and/or reproduction according to the present invention.

Referring to the drawings, a recording and/or reproducing method and apparatus embodying the present invention will be explained in detail. In the following description, an optical recording medium for recording and/or reproduction according to the present invention, that is an optical disc, is a CD-R.

Meanwhile, the present invention is not limited to application to a recording and/or reproducing method or apparatus for recording and/or reproducing a CD-R, but may also be applied to a method and apparatus for recording and/or reproducing, e.g., a replay-only optical disc, a variety of write-once optical discs or phase change type optical discs. The present invention is, of course, not limited to the recording density of a variety of optical discs.

Since the variable design parameters of the CD-R are standardized under the appellation of so-called Orange Book part II, only the basic structure is hereinafter explained.

Since the CD-R includes a disc substrate 1 formed of a resin material, such as polymethyl methacrylate (PMMA) or polycarbonate (PC) molded into a disc with an outer diameter Φ of 120 mm and a thickness of 1.2 mm. On this recording layer 1 is formed a signal recording layer 2 having an organic dye based recording material spin-coated thereon. On this recording layer 2 is formed a reflective layer 3 comprised of Au, Ag and Al, and a protective layer 4 is formed on the recording layer 3 by, e.g., spin coating a UV curable resin by spin coating.

With the present CD-R, a recording light beam, modulated in accordance with data for writing, referred to below as recording data, is illuminated on the signal recording layer 2. Then, by the interaction between the portion of the signal recording layer 2 illuminated by this recording light beam and the portion of the disc substrate 1 contacting it, the interface therebetween is deformed, whereby a recording mark corresponding to the recording mark is irreversibly formed. This recording mark is illuminated by the replay light beam and changes in reflectance are detected to read out data written on the CD-R.

Figure 2:
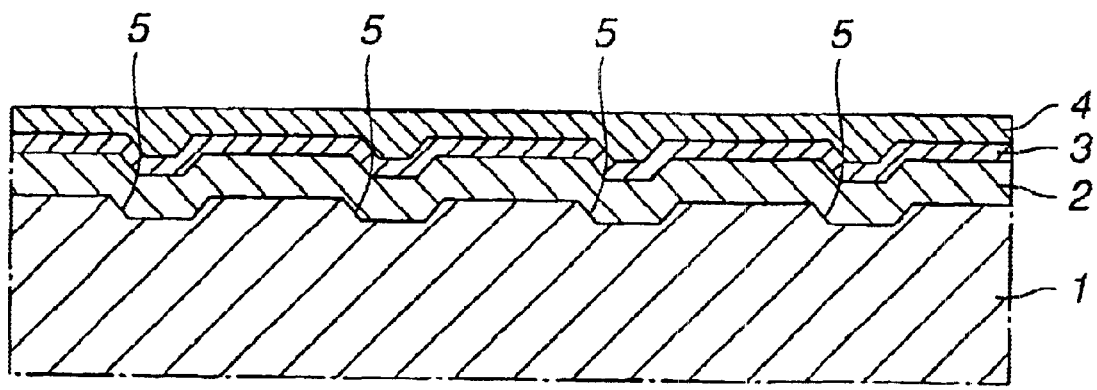
FIG. 2 is a schematic cross-sectional view showing a layered structure of the CD-R.
Figure 3:
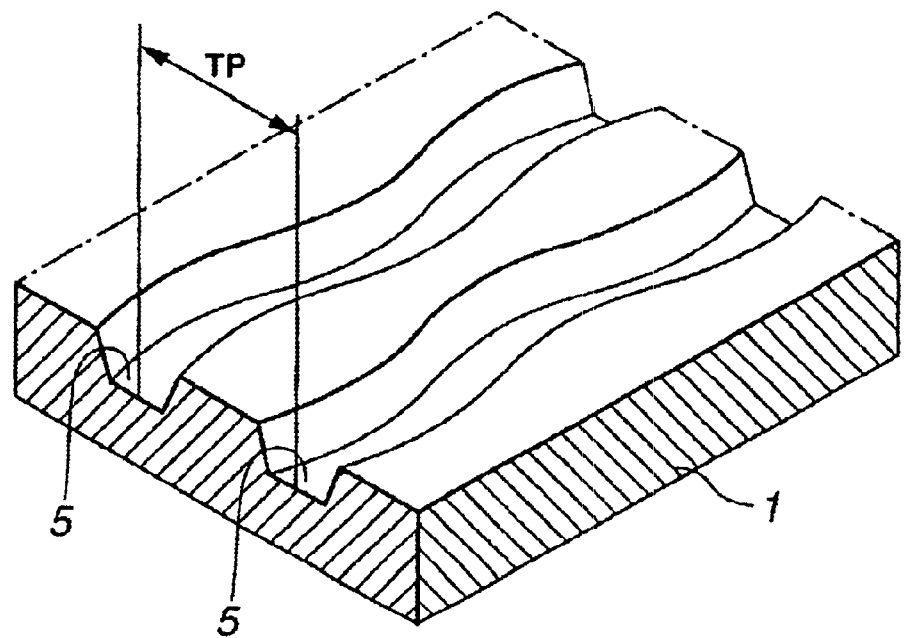
FIG. 3 is an enlarged schematic view showing essential portions of a pre-groove formed in the CD-R.

In the portion of the disc substrate 1, which provides a data recording area, a meandering pre-groove, as a guide groove, is formed, e.g., spirally, as shown in FIGS. 2 and 3. The portion of the signal recording layer 3, in register with the pre-groove 5, is set as a recording track, in which are recorded, for example, user data processed with error correction encoding or EFM modulation processing. Consequently, with this CD-R, an interval between neighboring pre-grooves 5 represents a track pitch.

The pre-groove 5 is adapted for meandering slightly sinusoidally, by way of wobbling. By this wobbling, the frequency modulated position information, that is the time domain information indicating the absolute position on the disc, is recorded as ATIP (absolute time in-pregroove) wobbling signal.

The ATIP wobbled signal is recorded so that, when a CD-R is run in rotation at a pre-set velocity, the center frequency will be equal to e.g., 22.05 kHz. The I-sector of the ATIP wobbled signal coincides with one data sector (2352 bytes) of user data. When writing the user data, it is written as the data sector of the user data is synchronized with the sector of the ATIP wobbled signal.

Heretofore, this ATIP wobbled signal includes the time domain information comprised of MSF values of minutes (M), seconds (S) and frames (F). On the other hand, in the CD-R in which the recording density is increased as interchangeability is kept with respect to the conventional CD-R or CD-RW, such as a so-called double density CD-R, the ATIP wobbled signal is recorded as the absolute positions on the disc by binary values defined by consecutive binary numbers.

Figure 4:
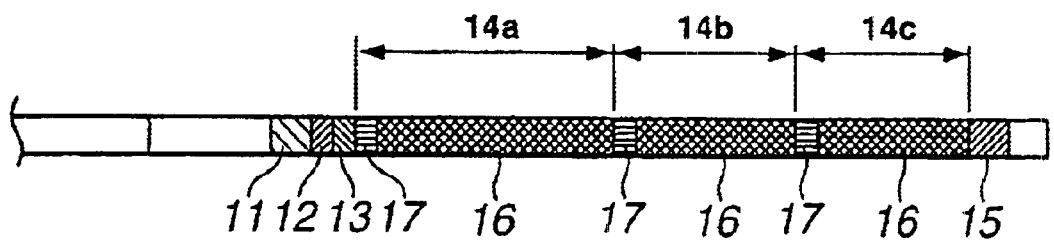
FIG. 4 is a schematic view showing a recording area formed in the CD-R.

Next, the recording format of this CD-R is explained. FIG. 4 shows a recording system in which plural logical tracks are recorded incidentally, that is in which the recording data is written in accordance with the system known as track-at-once system.

Referring to FIG. 4, there are set, in the data recording area of the CD-R, a PCA (power calibration area) 11, a PMA (program memory area) 12, a lead-in area 13, plural logical tracks 14a, 14b, 14c, collectively termed logical tracks 14, and a lead-out area 15. Although FIG. 4 shows a recording format for writing in accordance with the track-at-once system, recording data may also be written in the CD-R by a system termed a session-at-once system, in which plural sessions are written with e.g., the lead-in area 13, logical tracks 14 and the lead-out area 15 as one session.

The PCA 11 is an area for correcting the power of the light beam during recording and includes a test area for actual test writing and a count area for recording the using state of the test area. The PMA 12 is an area for storage transiently of the information exemplified by write data mode, recording start position or the recording end position. The mode will be explained subsequently. The PCA 11 and the PMA 12 are areas required only for recording. When the finalizing operation of writing the information pertinent to the written logical track in the lead-in area 13 has come to a close, neither PCA 11 nor the PMA 12 is accessed by the optical pickup of the optical pickup device.

The lead-in area 13 is an area used for reading out the recording data written in the logical track 14. In this area is written, for example, the TOC (table-of-contents) information. In the TOC information in the lead-in area 13, leading addresses of the plural tracks 14a to 14c are written with base 60 BCD (binary-coded decimal notation). This track leading address is made up of the time domain information of minutes (M), seconds (S) and frames (F) and is termed the MSF values. In the CD-R, the MSF values contained in the TOC information written in this lead-in area 13 are read out during reproduction to permit the optical pickup to access the desired recording track instantly.

In the plural logical tracks 14a, 14b, 14c, a program area 16, in which to write user data, and a pre-gap 17, which is a buffer area set at the leading position of this program area 16, are set.

The lead-out area 15 has the function of preventing the optical pickup of the optical disc device from overrunning the outer rim of the disc towards its outside.

The format of recording data recorded on the CD-R is now explained. The user data is recorded on the CD-R as it is processed with error correction by the convolution type dual coding termed the CIRC (cross interleave Reed-Solomon code) and modulated with EFM (eight-to-fourteen modulation).

The error correction encoding processing by CIRC performs encoding by the Reed-Solomon code (C2 code) every 14-byte (12-word) data to append 4-byte parity (Q parity). After interleaving the sum total of 28 byte user data and Q-parity, the encoding by the Reed-Solomon code (C2 code) is executed and further 4-byte parity (P-parity) is appended to provide a sum total of 32 bytes. The interleaving processing is the processing of affording delay of 0, D, 2D, 3D, . . . , m27D to data of .g., 28 symbols (24 symbols+4 symbols), where D denotes a delay parameter (unit delay quantity).

Figure 5:
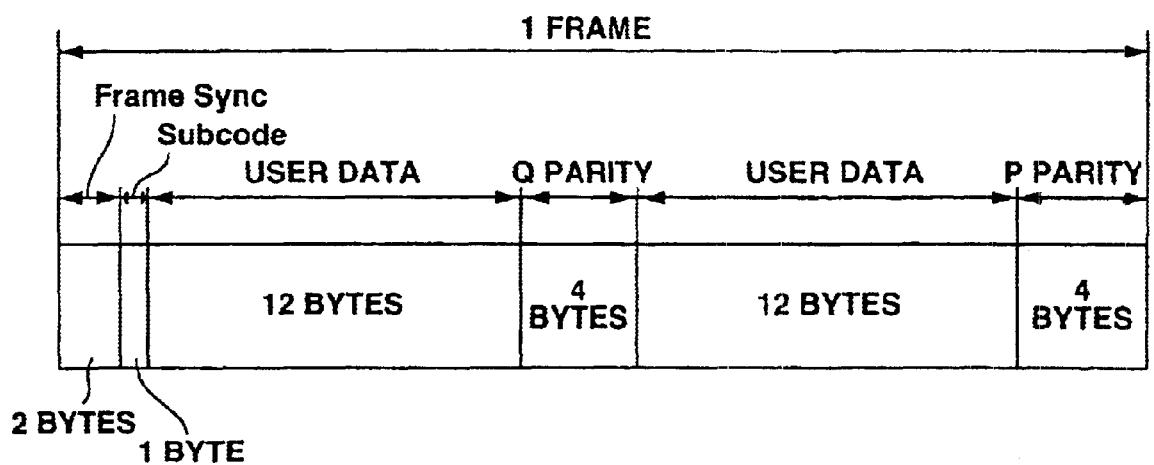
FIG. 5 is a schematic view showing the structure of a frame as a data transmission unit in the CD-R.
Figure 6:
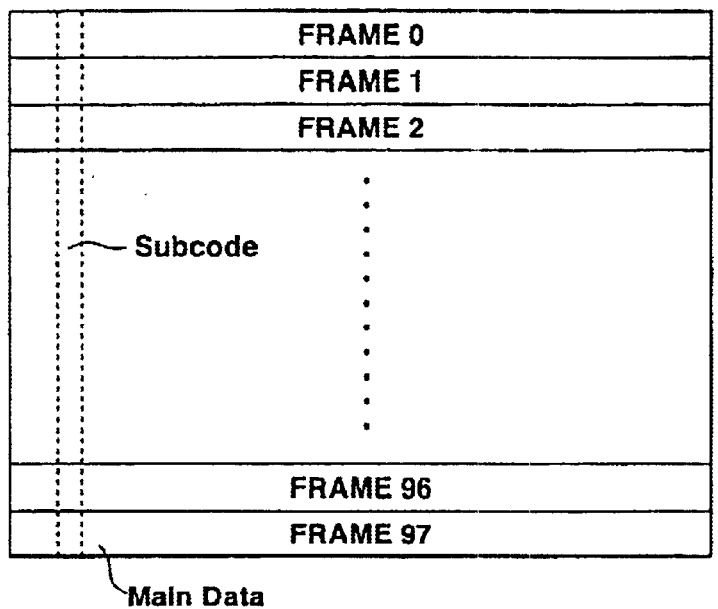
FIG. 6 is a schematic view showing the structure of one data block as a basic unit of the sub-code in the CD-R.

By the error correction processing; by the CIRC, 4-byte Q-parity and 4-byte P-parity are appended every 14-byte user data to give a sum total of 32 byte data. To the leading end of the data are appended the 2-byte frame synchronization [Frame Sync] and one-byte sub-code [Subcode] to constitute one frame as a transmission unit, as shown in FIG. 5.

The sub-code is made up of eight channels of P to W and one bit per channel, totaling at one byte, is inserted per frame. The sub-codes for 98 frames complete one information. By 98 frames, as data unit completing the sub-code, one data block (data sector), is completed, which represents an accessing unit when the optical disc device accesses the user data. In one data block, the remaining portion represents main data [Main Data] containing user data.

Figure 7:
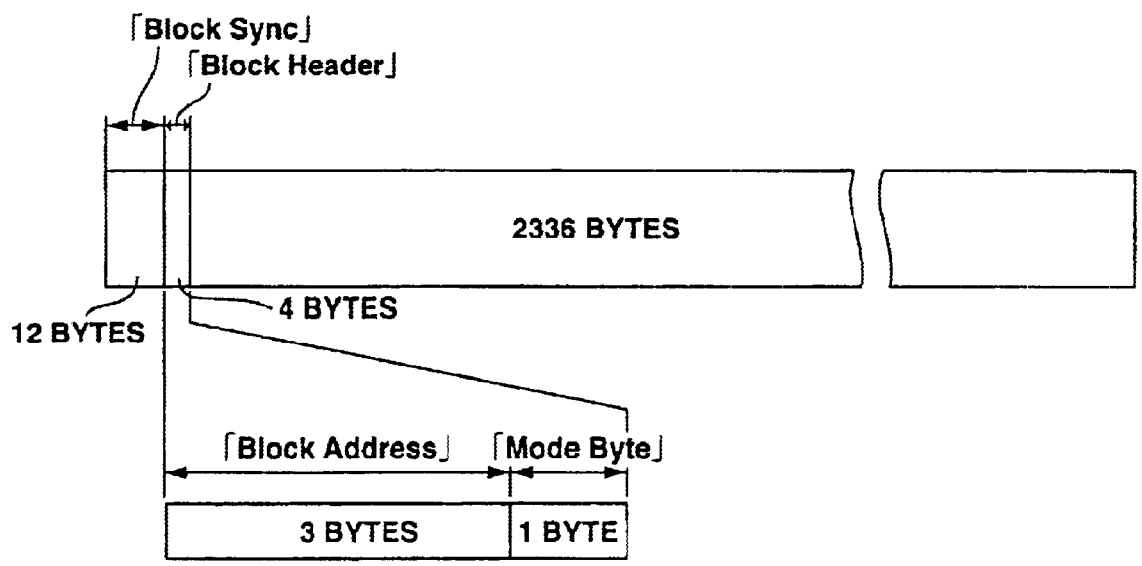
FIG. 7 is a schematic view showing the structure of main data contained in a data block in the CD-R.

The user data contained in one data block is data of a sum total of 2352 bytes (=24 bytes×98) and includes 12-byte block synchronization signals [Block Sync] and a 4-byte block header [Block Header] at its leading end, as shown in FIG. 7. In the block header, three bytes represent a block address [Block Address], with the remaining one byte being assigned as a mode byte [Mode Byte] representing the block attribute. In the block address, the address on the disc is recorded by binary values defined in consecutive binary numbers.

Figure 8:
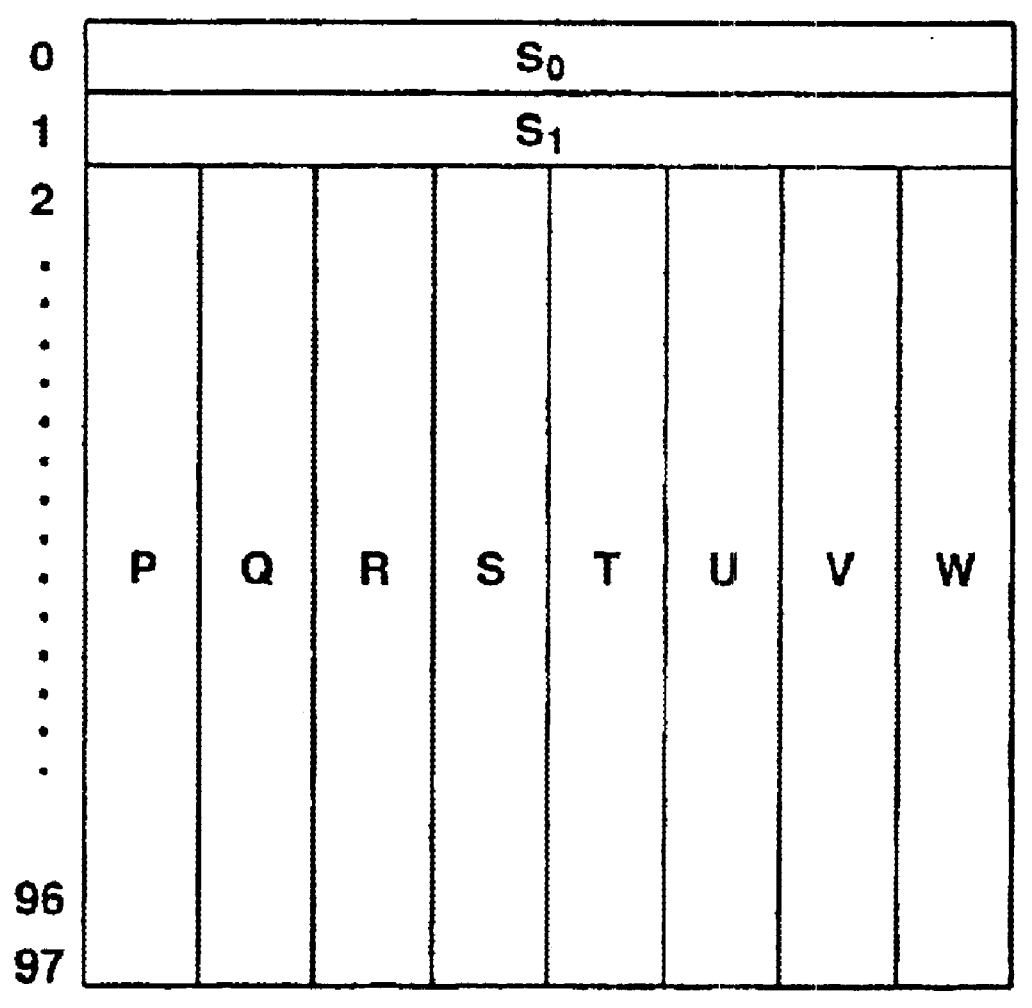

The sub-code contained in one data block is a data totaling at 98 bytes and has, at its leading end, 2-byte sub-code synchronization signal $S_0$, $S_1$, as shown in FIG. 8. The remaining 96 bytes are assigned to the channels P to W. Of these channels, the P and Q channels include the accessing information, such as the absolute time information or address information, used for accessing a data block to which belongs this sub-code, whereas the R to W channels include the information indicating the mode, item and instructions of the data block to which belongs this sub-code, and ancillary data.

Of the above-mentioned sub-codes, the Q-channel, referred to below as a sub-code Q, is now explained. In the conventional CD-R and CD-RW, the sub-code Q in the PMMA 12 and the lead-in area 13 is written in a data format shown for example in the following Table 1:

apparatus according to the present invention is constructed as described above.

Figure 9:
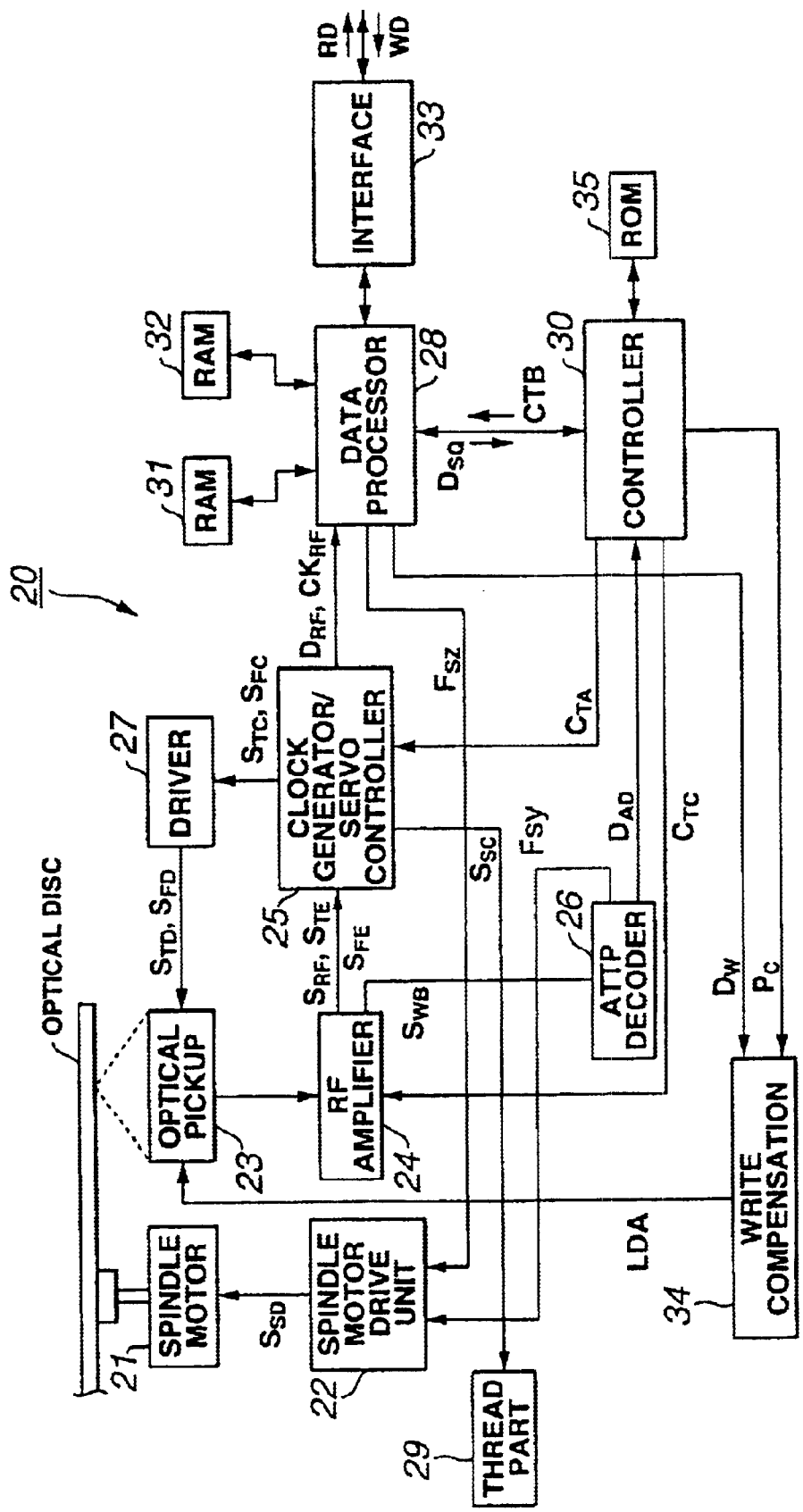
FIG. 9 is a schematic view of an optical disc device as an embodiment of the recording and/or reproducing apparatus according to the present invention.

An optical disc device 20 shown in FIG. 9, as an illustrative structure of the recording and/or reproducing apparatus for recording and/or reproducing the above-described CD-R, is hereinafter explained. In the following description, it is assumed that the optical disc device 20 is capable not only of recording and/or reproducing information signals for the CD-R but also of recording and/or reproducing information signals for a variety of optical discs to which the CD format applies, such as CD-ROM or CD-RW.

Of course, the present invention is not limited to application to an optical disc device for recording and/or reproducing an optical disc to which the CD format applies, but may be extensively applied to a recording and/or reproducing method and apparatus configured for recording and/or

TABLE 1

| CTR | ADR | TNO | POINT | MIN | SEC | FRM | ZERO | PMIN | PSEC | PFRM | CRC |
|---|---|---|---|---|---|---|---|---|---|---|---|
| | | | | (Subcode-Q, PMA) | | | | | | | |
| | 1 | 00 | 01 to 99 | absolute time when each track begins | | | 00 to 99 | absolute time every track ends | | | |
| | 2 | 00 | 00 | disc identification | | | 00 to 09 | 00 | 00/10/20 | 00 | |
| | | | | (Subcode Q, Lead-in) | | | | | | | |
| | | 00 | 01 to 99 | absolute time | | | 00 | absolute time when each track ends | | | |
| | | 00 | A0 | absolute time | | | 00 | initial TNO | 00 | 00 | |
| | | 00 | A1 | absolute time | | | 00 | initial TNO | 00 | 00 | |
| | | 00 | A2 | absolute time | | | 00 | absolute time when lead-out begins | | | |

That is, in the conventional CD-R or CD-RW, the address indicating the time domain information is recorded in the sub-code Q as MSF values comprised of minutes (M), seconds (S) and frames (F).

In a CD-R, proposed for effecting high density recording as interchangeability is maintained with respect to the conventional CD-R and CD-RW, the data format as shown for example in the following Table 2 are written:

reproducing information signals along a recording track of a disc-shaped optical recording medium.

In the optical disc device 20, an optical disc is run in rotation at a pre-set speed by a spindle motor 21. Meanwhile, the spindle motor 21 runs the optical disc at a pre-set speed by a spindle driving signal SSD from a spindle motor driving unit 22 as later explained.

An optical disc is illuminated with an light beam controlled in light volume from an optical pickup device 23 of

TABLE 2

| CTR | ADR | TNO | POINT | MIN | SEC | FRM | HOUR | PHOUR | PMIN | PSEC | PFRM | CRC |
|---|---|---|---|---|---|---|---|---|---|---|---|---|
| | | | | (Subcode-Q, PMA) | | | | | | | | |
| | 1 | FF | 01 to 99 | absolute time when each track begins | | | | absolute time when each track ends | | | | |
| | 2 | FF | 00 | disc identification | | | | 0 | 00 | 00/10/20 | 00 | |
| | | | | (Subcode- Q, Lead-in) | | | | | | | | |
| | | 00 | 01 to 99 | absolute time | | | | absolute time when each track ends | | | | |
| | | 00 | A0 | absolute time | | | | 0 | initial TNO | 00 | 00 | |
| | | 00 | A1 | absolute time | | | | 0 | initial TNO | 00 | 00 | |
| | | 00 | A2 | absolute time | | | | absolute time when lead-out begins | | | | |

As shown in Table 2, in the double density CD-R, in keeping pace with the elongation of the recording time due to the high density recording, the HOUR area and the PHOUR area, indicating the "time" in the time domain information are provided in the sub Q in the PMA 12 and the lead-in area 13 in addition to the MSF value.

The CD-R in which the recording and/or reproduction takes place by the recording and/or reproducing method and the optical disc device 20. The light beam reflected back by the optical disc is illuminated on a photodetector, not shown, of the optical pickup 23. The photodetector is constructed by, e.g., a split photodetector for generating a voltage signal corresponding to the reflected light by photoelectric conversion and current to voltage conversion and for routing the so-generated voltage signal to an RF amplifier 24.

Based on the voltage signal from the optical pickup 23, the RF amplifier 24 generates a readout signal $S_{RF}$, a focussing error signal $S_{FE}$, a tracking error signal $S_{TE}$ and a wobbling signal $S_{WB}$. Of these signals, generated by this RF amplifier 24, the readout signal $S_{RF}$, focussing error signal $S_{FE}$ and the tracking error signal $S_{TE}$ are routed to a clock generating/servo controlling unit 25, while the wobbling signal $S_{WB}$ is routed to an ATIP decoder 26.

The clock generating/servo controlling unit 25 generates, based on the focussing error signal $S_{FE}$, supplied thereto, the focussing control signals $S_{FC}$ for controlling an objective lens, not shown, of an optical pickup 23, so that the focal point position of the light beam will be the position of the signal recording layer 2 of the optical disc. The clock generating/servo controlling unit 25 then routes the focussing control signals $S_{FC}$ so generated, to a driver 27. The clock generating/servo controlling unit 25 also generates, based on the tracking error signals $S_{TE}$, supplied thereto, the tracking control signal $S_{TC}$ for controlling an objective lens, not shown, of an optical pickup 23, so that the illuminated position of the light beam will be at the center of the recording track, and routes the tracking control signal $S_{TC}$ so generated to the driver 27.

The driver 27 generates focussing driving signal $S_{FD}$, based on the focussing control signals $S_{FD}$, while generating tracking driving signal $S_{TD}$ based on the tracking control signal $S_{TC}$. The focussing driving signal $S_{FD}$ and the tracking driving signal $S_{TD}$, so generated, are sent to an actuator, not shown, of the optical pickup 23, to control the objective lens position to manage control to cause the light beam to form a focal point at a center position of the desired recording track.

The clock generating/servo controlling unit 25 effects asymmetry correction and binary coding of the readout signal $S_{RF}$ and digitally converts the resulting signal to route the converted digital signal as the readout data signal $D_{RF}$ which is routed to a data processing unit 28. The clock generating/servo controlling unit 25 also generates clock signals $CK_{RF}$ synchronized with the converted digital signal which is sent to the data processing unit 28.

The clock generating/servo controlling unit 25 generates a sled control signal $S_{SC}$ adapted for causing the movement of the optical pickup 23 along the radius of the optical disc so that the illuminated position of the light beam will not surpass the tracking control range to route the so-generated sled control signal $S_{SC}$ to a sled unit 29. The sled unit then actuates a sled motor, not shown, based on the sled control signal $S_{SC}$, to cause the movement of the optical pickup 23 along the radius of the optical pickup 23.

After applying bandpass filtering to the wobbling signal $S_{WB}$, supplied from the RF amplifier 24, the ATIP decoder 26, the ATIP decoder 26 generates clock signals synchronized with the carrier components of the wobbling signal $S_{WB}$ while binary coding the wobbling signal $S_{WB}$. Based on the clock signals, the ATIP decoder 26 performs biphase mark demodulating processing of the binary-coded wobbling signal $S_{WB}$ to generate ATIP information signals $D_{AD}$. The ATIP decoder 26 also detects a synchronization signal pattern of the produced ATIP information signals $D_{AD}$ to generate an ATIP synchronization detection signal $F_{SY}$. The ATIP decoder 26 routes the ATIP information signals $D_{AD}$ to the controller 30, while sending the ATIP synchronization detection signal $F_{SY}$ to a spindle motor driving unit 22.

The data processing unit 28 EFM modulates the read-out signal $D_{RF}$ while performing deinterleaving and error correction by CIRC using a RAM 31. The data processing unit 28 also performs descrambling and error correction by ECC (error correction code). The error-corrected data signals are transiently stored in a RAM 32 as a buffer memory, while being routed as a replay data signal RD to a host device, such as a computer, connected to outside over an interface 33.

The data processing unit 28 takes out the sub-codes from the EFM-demodulated signal to send the sub-code signal as a signal $D_{SQ}$ to a controller 30, while detecting a frame synchronization signal $F_{SZ}$ in the EFM-demodulated signal which is routed to a spindle motor driving unit 32.

In recording information signals on an optical disc, the spindle motor driving unit 22 uses the ATIP synchronization detection signal $F_{SY}$ from the ATIP decoder 26. In reproducing the information signals recorded on the optical disc, the spindle motor driving unit 22 generates a spindle driving signal $S_{SD}$ for rotationally driving the optical disc at a pre-set speed using the frame synchronization signal $F_{SZ}$ from the data processing unit 28 or the ATIP synchronization detection signal $F_{SY}$ from the data processing unit 28. By the spindle driving signal $S_{SD}$, generated by the spindle motor driving unit 22 and sent to the spindle motor 21, the optical disc is run in rotation at a pre-set speed.

When fed with the recording data signal WD over an interface 33 from an externally connected host device, the data processing unit 28 transiently stores the recording data signals WD in the RAM 32, while reading out the stored recording data signals WD and encoding the read-out signal in accordance with a pre-set sector format to append the ECC for error correction to the read-out signals. The data processing unit 28 also performs CIRC encoding and EFM modulation to generate a write signal $D_W$ which is routed to a write compensation unit 34.

The write compensation unit 34 generates a laser driving signal LDA, based on the write signal $D_W$, supplied thereto, to send the generated laser driving signal to a laser diode of the optical pickup 23. The write compensation unit 34 corrects the signal level of the laser driving signal LDA, responsive to the characteristics of the signal recording layer 2 of the optical disc, spot shape of the light beam or to the relative linear velocity of the recording tracks, based on a power compensation signal $P_C$ from the controller 30 as later explained. This allows the information recording device 20 to perform the recording as it optimize the power of the light beam output from the laser diode of the optical pickup 23.

The controller 30, to which is connected a ROM 35, controls the operation of the optical disc device 20 based on the operation controlling program stored in the ROM 35. For example, the controller 30 sends the control signal $C_{TA}$ to the clock generating/servo controlling unit 25, or sends a control signal $C_{TB}$ to the data processing unit 28, based on e.g., the signal $D_{SQ}$, such as sub-codes, generated by the data processing unit 28, or the position information of the recording area represented by the ATIP information signals $D_{AD}$ from the ATIP decoder 26.

The controller 30 generates the power compensation signal $P_C$, based on the setting information of the recording laser power, represented by the ATIP information signals $D_{AD}$, to send the so-generated power compensation signal $P_C$ to the write compensation unit 34. The controller 30 also sends the control signal $C_{TC}$ to the RF amplifier 24 to cause the RF amplifier 24 to perform the on/off control of the laser diode of the optical pickup 23 and the operation of superimposing high frequency signals on a light beam for reducing the interference to readout signals or the laser noise.

Meanwhile, in the optical disc device 20, recording and/or reproduction on or from an optical disc is executed responsive to a request from a host device connected to outside. The request from the host device at this time is made an as accessing request to a specified recording track on the optical disc with the first address value (MSF value) defined as the time domain information or with the second address (LBA value) defined as consecutive hexadecimal numbers. However, in many cases, a request for recording and/or reproduction is made with the LBA value from the host device.

Figure 10:
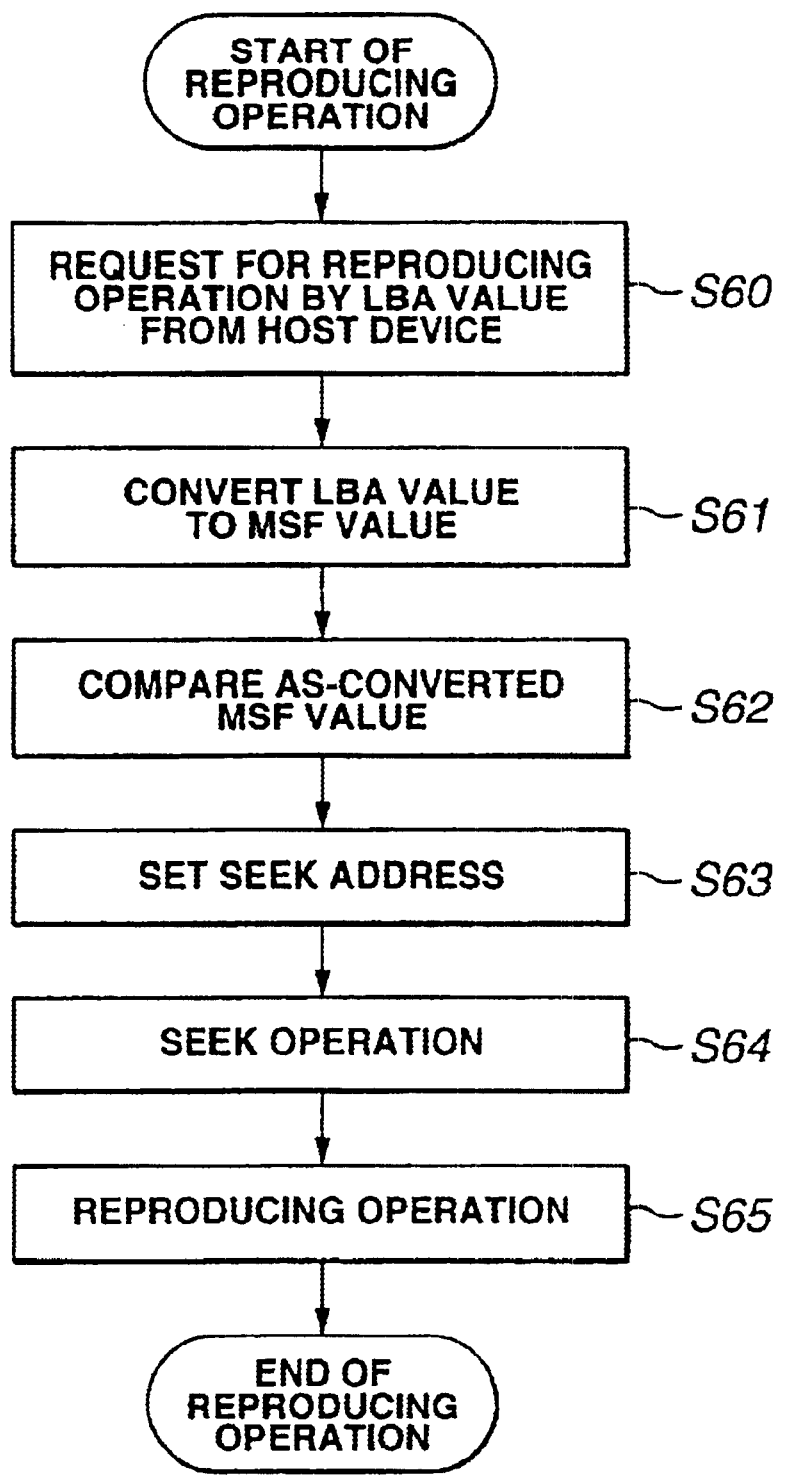
FIG. 10 is a flowchart showing an exemplary operation in the reproducing operation in the optical disc device.

If, for example, a replay request is made with the LBA value from the host device, the optical disc is accessed, as shown in FIG. 10.

That is, a request for a reproducing operation from an optical disc is input from a host device, connected to outside, to the optical disc device 20 over an interface 33. The request from the host device is made with e.g., the LBA value.

Then, based on the LBA value, input to the host device, a seek address to the optical disc is set for actually accessing the optical disc. At this time, the leading address of the logical track contained in the TOC information recorded on the lead-in area 13 is recorded on the optical disc. So, for setting the seek address, the LBA value input from the host device is converted into the MSF value, as indicated at step S61.

Next, at step S62, the converted MSF value is compared to the leading address of the logical address contained in the TOC information of the optical disc. Based on the result of comparison, the target seek address is set at step S63. At this step S63, the target address of the encoder or the decoder for the recording data may be set as in setting the seek address. This target address is an address for starting the buffering in encoding or decoding the recording data. Specifically, in the optical disc device 20, the operation is so made that the address slightly ahead of the address for recording and/or reproduction is set as a seek address, the recording track is traced by the optical pickup 23 from a position slightly ahead of the target address and the buffering for decoding the recording data is started at a time point of accessing the target address.

Then, at step S64, the controller 30 causes the sled unit 20 to be actuated to seek the optical pickup 23 to access the seek address as set at step S63.

Next, at step S65, the replay operation is performed for the accessed address.

Figure 11:
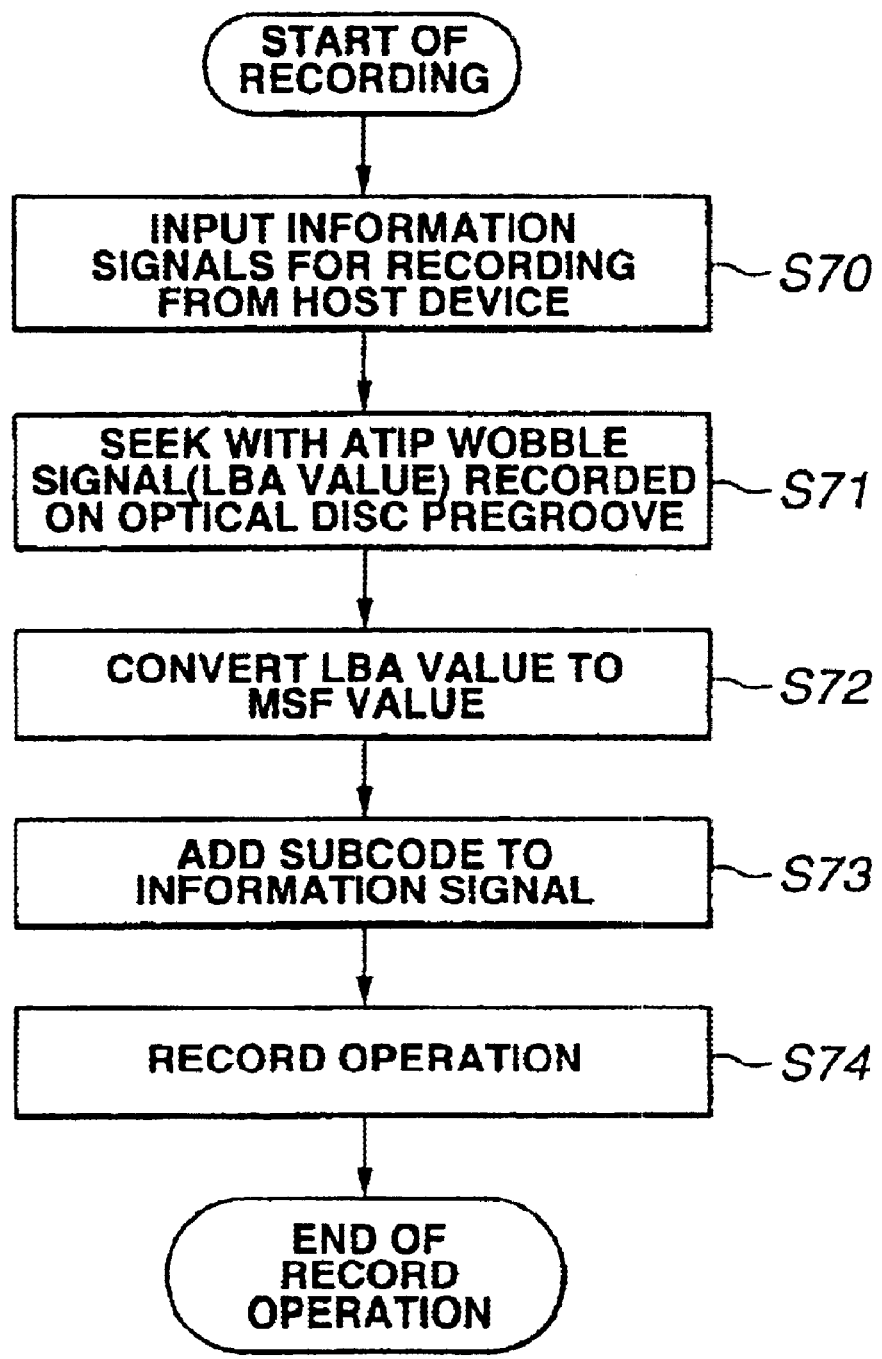
FIG. 11 is a flowchart showing an exemplary operation in the recording operation in the optical disc device.

In the recording on the optical disc, the optical disc device 20 operates as shown in FIG. 11.

That is, the optical disc device 20 is fed with an information signal for recording, from the externally connected host device, over the interface 33, as indicated at step S70 shown in FIG. 11.

Next, at step S71, the seek operation occurs at a position of recording on the optical disc and the pre-groove 5 at this position is detected to detect the absolute position on the optical disc contained in the ATIP wobbled signal recorded on the pre-groove 5. In the conventional CD-R or CD-RW, the absolute position is recorded with the MSF value in the ATIP wobbled signal. In the case of the double-density CD-R, the absolute position is recorded with a binary value in the ATIP wobbled signal.

In the optical disc device, binary values detected from the optical disc are converted at step S72 into MSF values.

Next, as shown at step S73, the sub-code, inclusive of the as-converted MSF value, is generated, and superimposed on the information signals for recording, such as to effect the recording, as indicated at step S74. At step S73, the block address contained in the block header in the user data is also generated and recorded simultaneously as the information signals for recording.

Meanwhile, if, in the optical disc device 20, the optical disc is to be accessed, the address conversion processing needs to be executed between the MSF value, as the first address, and the LBA value or the binary value, as the second address, as mentioned previously.

In the optical disc device 20, according to the present invention, the above-described address conversion processing is executed by the data processing unit 28. The RAM 31 or RAM 32 holds a conversion table indicating the correspondence between the uppermost order value of the time domain information in the MSF values as the first address and the second address. When the conversion processing occurs between the first and second addresses, the conversion table held by the RAM 31 or the RAM 32 is used.

At this time, the uppermost order value in the time domain information in the MSF values, that is the value of the minute (M), is roughly converted by the conversion table or binary value, after which the remaining time domain information, that is the seconds (S) or the frame (F), is calculated by processing in the data processing unit 28 by calculation processing so that the MSF values are converted by the data processing unit 28 into the LBA or binary values. Conversely, should the LBA value be converted into the MSF or binary values, the minute (M) value is first converted by the data processing unit 28 and the remaining values, that is the second (S) and the frame (F) values, are calculated by the data processing unit 28 to convert the LBA values into the MSF or binary values.

With the optical disc device 20 according to the present invention, in which the first address may be roughly converted with the conversion table into second address data and vice versa, by way of address conversion, it is possible to effect the conversion processing efficiently to shorten the processing time.

If the optical disc being accessed is a large capacity optical disc, it may be envisaged to achieve more efficient conversion processing using the first address having a still upper order value than the minute (M), that is hour (H), by way of enlarging the MSF value. This still upper order value is hereinafter termed a HMSF value.

In the conventional optical disc, such as CD-R or CD-RW, the recording capacity is 60 to 74 minutes in terms of the music data. Recently, an optical disc having a recording capacity of 80 minutes is being put to practical use. In consideration of the tendency towards a higher recording density of the optical disc, the optical disc with a higher capacity can be coped with by managing the address of 60 minutes (M) as one hour (H).

In the following, a large capacity optical disc, with a recording capacity of 320 minutes, the case of accessing the disc using an HMSF value as the first address is explained.

In this case, a conversion shown in Table 3 is held in the RAMs 31 or 32 in the optical disc device 20:

TABLE 3

HMSF Value to Binary Conversion Table

| first address (HMSF value) H:M:S:F | second address (binary value) (hexadecimal notation) |
|---|---|
| 00:00:00:00 | 00000000 |
| 01:00:00:00 | 00041EB0 |
| 02:00:00:00 | 00083D60 |
| 03:00:00:00 | 000C5C10 |
| 04:00:00:00 | 00107AC0 |
| 05:00:00:00 | 00149970 |

In this conversion table, the binary value at [00041EB0] in the hexadecimal notation corresponds to one hour (H) in the HMSF value, while the binary value at [00083D60] in the hexadecimal notation corresponds to two hours (H) in the HMSF value. That is, in this conversion table, the uppermost value in the HMSF value as the first address is associated with the binary value which is the second address represented in the hexadecimal notation.

In the optical disc device 20 according to the present invention, the data processing unit 28 converts the HMSF value into the LBA value and vice versa, by executing the following processing with the aid of the conversion table held by the RAM 31 or 32.

The case of converting the HMSF value, as the first address recorded in the sub-code Q, into a binary value as the second address contained in the ATIP wobbled signal recorded on the pre-groove of the optical recording medium, or into the binary value contained in the block header contained in the user data, is explained. If, in the HMSF values, the values of hour (H), minute (M), second (S) and frame (F) are $AD_H$, $AD_M$, $AD_S$ and $AD_F$, respectively, and the value of the binary number is $AD_{LBA}$, the relation among these values is represented by the following equation 1:

$$AD_{LBA} = ((AD_H \times 60 + AD_M) \times 60 + AD_S) \times 75 + AD_F \quad (1)$$

$$= \underline{AD_H \times 60 \times 60 \times 75} + (AD_M \times 60 + AD_S) \times 75 + AD_F.$$

In the optical disc device 20, the data processing unit 28 converts the value of the hour (H) in the HMSF value into the binary value, using the conversion table shown in Table 1. That is, the address conversion processing of the underlined portion in the equation 1 is performed using the conversion table. The address conversion processing as from the underlined portion in the equation 1, that is the values of the minutes (M), seconds (S) and frames (F) in the HMSF value, are calculated by the data processing unit 28 in accordance with the equation 1. Specifically, the binary value coincident with the byte of the hour (H) in the HMSF values is retrieved from the conversion table shown in Table 1. This binary value is summed to the results of calculations corresponding to the minutes (M), seconds (S) and frames (F) in the equation 1. Thus, by using the conversion table, the optical disc device 20 is able to evade the multiplication processing of the underlined portion in the equation 1.

The case of converting the binary value as the second address to the HMSF value as the first address is explained. In this case, the data processing unit 28 refers to the conversion table shown in Table 1 to verify that the time is zero hour (H) and one hour (H) when the binary value is [00000000] to [00041EAF] or when the binary value is [00041EB0] to [00083D5F], respectively. The value of the hour (H), representing the result verified, which is $AD_H$, is subtracted from the original binary value. With the value of the binary value on subtraction set to $AD_{LBA}$, the data processing unit 28 executes the calculations represented by the following equation (2):

$$AD_M = Int\ (AD_{LBA}/75/60)$$

$$AD_S = Int\ (mod(AD_{LBA}/75/60)/75)$$

$$AD_F = mod\ (mod(AD_{LBA}/75/60)/75) \quad (2)$$

where Int ( ) denotes a quotient and mod ( ) denotes the remainder.

For calculating $AD_H$ without using the conversion table, the calculation processing shown by the following equation (3):

$$AD_H = Int\ (AD_{LBAO}/75/60/60) \quad (3)$$

where $AD_{LBAO}$ is the original binary value and Int ( ) denotes a quotient, is further necessary.

That is, by using the conversion table, the optical disc device 20 is able to evade the division shown in the equation (3).

In the foregoing description, the case of converting the HMSF value recorded in the sub-code Q into the binary value contained in the ATIP wobbled signal or in the block header, has been explained, so that the HMSF value [00:00:00:00] is set to [00000000]. However, if, in the present invention, conversion is made between the HMSF value recorded in the sub-code Q and the LBA value input from the host device, and there is an offset as when the HMSF value [00:00:02:00] is set to the LBA value [00000000], it is sufficient if this offset amount is taken into account in executing the address conversion processing.

If, among the values of HMSF recorded in the sub-code Q, the values of the hour (H), minute (M), second (S) and the frame (F) are $AD_H$, $AD_M$, $AD_S$ and $AD_F$, respectively, the value of LBA input from the host device is $AD_{LBA}$ and the address to be offset is $AD_{OF}$, the relationship among these values is indicated by the following equation (4):

$$AD_{LBA} = ((AD_H \times 60 + AD_M) \times 60 + AD_S) \times 75 + AD_F - AD_{OS} \quad (4)$$

$$= \underline{AD_H \times 60 \times 60 \times 75} + (AD_M \times 60 + AD_S) \times$$

$$75 + AD_F - AD_{OS}.$$

In converting the LBA value into the HMSF value, it suffices if the calculation processing shown by the following equation (5):

$$AD_M = Int\ ((AD_{LBA} + AD_{OS})/75/60)$$

$$AD_S = Int\ (mod((AD_{LBA} + AD_{OS})/75/60)/75)$$

$$AD_F = mod\ (mod((AD_{LBA} + AD_{OS})/75/60)/75) \quad (5)$$

where Int ( ) denotes a quotient and mod ( ) denotes the remainder, is executed in place of the above-mentioned equation (5).

This allows to omit the calculation processing shown by the following equation (6):

$$AD_H = Int\ ((AD_{LBA} + AD_{OS})/75/60/60) \quad (6)$$

where Int ( ) denotes a quotient.

According to the present invention, the number of times of the multiplying or dividing operations may be smaller than that in case of performing the address conversion processing without using the conversion table. Thus, it becomes possible to reduce the operating time necessary for address conversion processing to shorten the response tome on reading out or writing data from or on the optical disc. Since the number of times of the multiplying or dividing operations is reduced to simplify the arithmetic operations necessary in effecting address conversion processing, the multiplying circuit or the division circuit in the data processing unit 28 may be simplified to reduce the number of gates to diminish the circuit scale of the semiconductor chip.

In effecting conversion between the first address (MSF value) and the second address (LBA value or the binary value), it is also possible to hold the relation of correspondence in a conversion table to effect address conversion only by referring to the conversion table without performing calculating processing. However, in this case, there is required a considerable memory space to hold a voluminous conversion table, while the time needed in referencing the conversion table is also increased. Therefore, it may be said to be desirable to reference the uppermost order value only of the time domain information in the first address, using the conversion table, as in the present invention.

The optical disc device 20 may also be configured for recording and/or reproducing both a conventional optical disc, such as CD-R or CD-RW, referred to below as a first optical disc, and an optical disc proposed so as to assure compatibility with the conventional optical disc and to achieve high recording density, referred to below as a second optical disc. If, in this case, an address is recorded in the MSF value in the sub-code Q, pre-groove 5 and in the block header in the first optical disc, whereas only the sub-code Q is recorded in the MSF value and the address is recorded in the binary value in the pre-groove 5 and in the block header, it is necessary for the optical disc device 20 to discriminate the optical disc type being recorded and/or reproduced to decide whether or not address conversion is to be executed.

Figure 12:
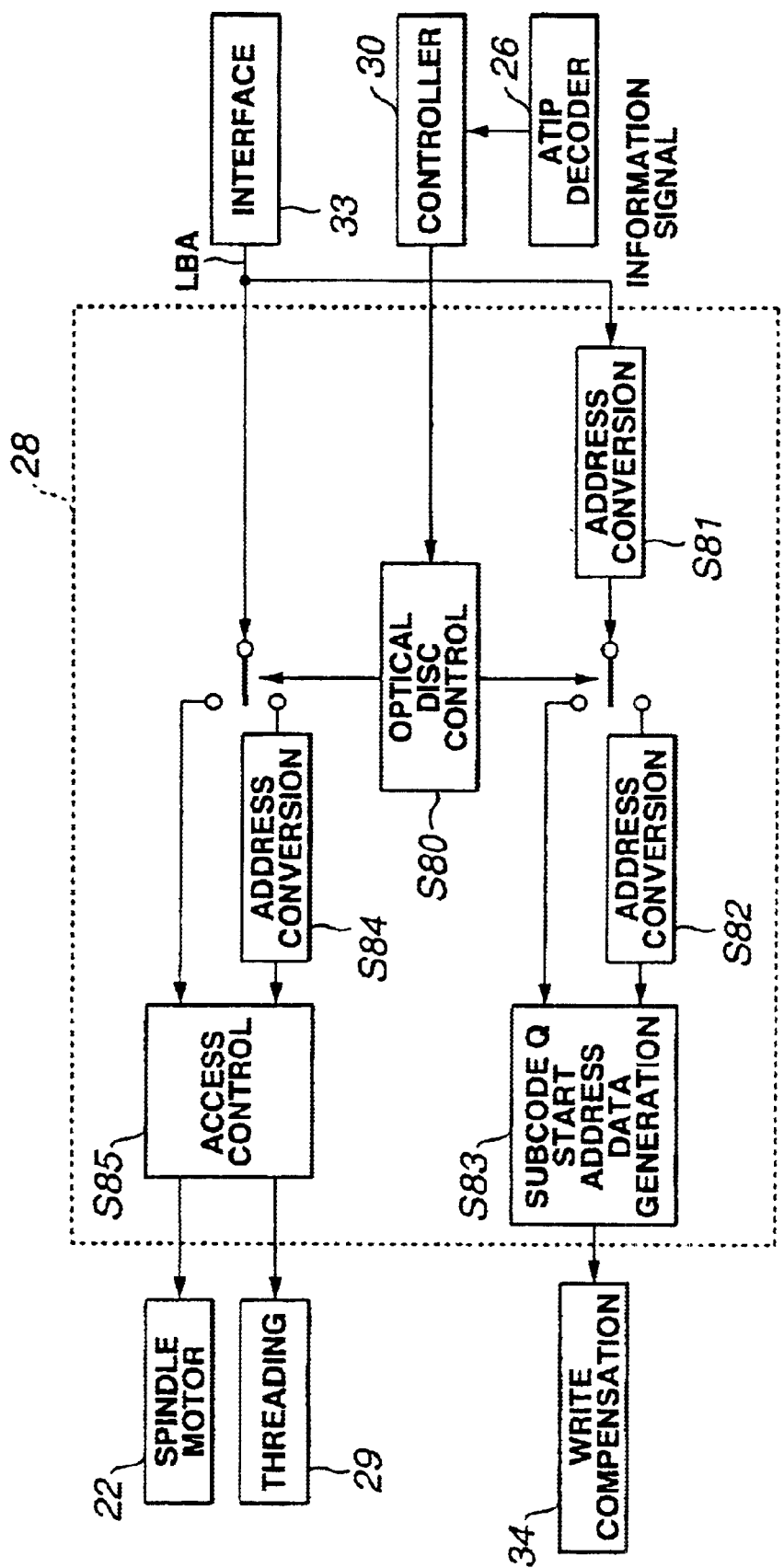
FIG. 12 is a functional block diagram showing an illustrative structure of a data processor in the optical disc device.

In such case, the optical disc type is verified in the data processing unit 28, as at S80 in FIG. 12. Meanwhile, FIG. 12 is a functional block diagram functionally showing the operation of the data processing unit 28.

In discriminating the type of the optical disc in this manner, it is discriminated whether the optical disc being recorded and/or reproduced is the first optical disc or the second optical disc, from e.g., the synchronization signal pattern contained in the ATIP wobbled signal, based on e.g., a signal input from the ATIP decoder 26 through the controller 30. Alternatively, the optical disc may be discriminated from the information recorded in the lead-in area 13 of the optical disc or the information contained in the sub-code recorded in the recording track, instead of from the ATIP information.

If the information signals are input through the interface 33 from the host device during the recording operation, the data processing unit 28 generates a write start address, as indicated at step S81 in FIG. 12. The write start address so generated is converted, depending on the type of the optical disc being recorded, as indicated at step S82, to generate the sub-code Q, start address, recording data to be written, and so forth. In case no address conversion processing is required, the sub-code Q, start address and the recording data may be produced without executing the address conversion processing.

If the LBA value is input via interface 33 from the host device during the reproducing operation, for example, address conversion processing is carried out depending on the type of the optical disc being reproduced, for conversion to the MSF value, to access the spindle motor driving unit 22 and to the sled unit 29, as indicated at step S85. If no address conversion is required, the LBA value is directly used as the binary value to effect access control as indicated at step S85.

Moreover, in the optical disc 20, it may be determined whether or not the address conversion processing is to be made, depending on whether the request input from the host device is the LBA value or the MSF value, or whether the address necessary in accessing the optical disc in recording and/or reproduction is the LBA value or the MSF value, in addition to discriminating whether or not the address conversion processing is to be made depending on the type of the optical disc being recorded and/or reproduced.

In the above-described embodiment, the data processing unit 28 takes charge of the address conversion processing or the discrimination of the optical disc type. Alternatively, the address conversion processing or the discrimination operation may also be performed by the controller 30.

What is claimed is:

1. A recording and/or reproducing apparatus for recording and/or reproducing information signals along a recording track on a disc-shaped optical recording medium, comprising:

rotational driving means for rotationally driving said optical recording medium at a pre-set speed;

recording and/or reproducing means movable along the radius of said optical recording medium for recording and/or reproducing information signals on or from the recording track of the optical recording medium;

address conversion means for reciprocally converting a first address in said optical recording medium defined by time domain information and a second address in said optical recording medium defined by consecutive binary numbers; and memory means for holding a conversion table for conversion between an uppermost order value in the time domain information in said first address and a value of said second address;

said address conversion means reciprocally converting said first address and said second address using said conversion table held in said memory means.

2. The recording and/or reproducing apparatus according to claim 1 wherein said first address has four time units of hour (H), minute (M), second (S) and frame (F) as address values and wherein said memory means holds a conversion table for conversion of the value of the hour (H) as the uppermost order time unit in said first address and the value of said second address.

3. The recording and/or reproducing apparatus according to claim 1 wherein said address conversion means converts the value of the second address recorded in a pre-groove formed along a recording track of said optical recording medium during recording on said optical recording medium into said first address, and wherein said recording and/or reproducing means records the information signals on said optical recording medium using the first address converted by said address conversion means.

4. The recording and/or reproducing apparatus according to claim 1 wherein said address conversion means converts the second address input from a host device into the first address during replay of said optical recording medium;

said recording and/or reproducing means locating the logical track based on the result of comparison between the first address converted by said address conversion means and the address of the logical track contained in table-of-contents information recorded in the lead-in area of said optical recording medium.

5. The recording and/or reproducing apparatus according to claim 1 further comprising:

means for discriminating a standardized first optical recording medium and a second optical recording medium which achieves high recording density as it is rendered convertible with said first optical recording medium;

said address conversion means executing address conversion, using said conversion table, responsive to the result of discrimination by said discriminating means.

6. A recording and/or reproducing apparatus for recording and/or reproducing information signals along a recording track on an optical recording medium, comprising:

a spindle motor for rotationally driving said optical recording medium at a pre-set speed;

a recording and/or reproducing head movable along the radius of said optical recording medium for recording and/or reproducing information signals on or from the recording track of said optical recording medium;

an address converter for reciprocally converting a first address defined with time domain information and a second address defined with consecutive binary numbers in said optical recording medium; and a memory for holding a conversion table for holding values of the time domain information in said first address and the values of said second address;

said address converter reciprocally converting said first and second addresses using said conversion table held by said memory means; and further comprising:

means for discriminating a standardized first optical recording medium and a second optical recording medium which achieves high recording density as it is rendered convertible with said first optical recording medium; said address converter executing address conversion, using said conversion table, responsive to the result of discrimination by said discriminating means.

7. The recording and/or reproducing apparatus according to claim 6 wherein said first address has four time units of hour (H), minute (M), second (S) and frame (F) as address values and wherein said memory means holds a conversion table for conversion of the value of the hour (H) as the uppermost order time unit in said first address and the value of said second address.

8. The recording and/or reproducing apparatus according to claim 6 wherein said address conversion converts the value of the second address recorded in a pre-groove formed along a recording track of said optical recording medium during recording on said optical recording medium into said first address, and wherein said recording and/or reproducing head records the information signals on said optical recording medium using the first address converted by said address conversion means.

9. The recording and/or reproducing apparatus according to claim 6 wherein said address converter converts the second address input from a host device into the first address during replay of said optical recording medium;

said recording and/or reproducing head locating the logical track based on the result of comparison between the first address converted by said address conversion means and the address of the logical track contained in table-of-contents information recorded in the lead-in area of said optical recording medium.

10. A recording and/or reproducing method for recording and/or reproducing information signals along a recording track of a disc-shaped optical recording medium, comprising the steps of:

reciprocally converting a first address in said optical recording medium defined with time domain information and a second address defined with consecutive binary numbers; and recording and/or reproducing information signals for said optical recording medium using an address as converted by said address converting step;

said address converting step effecting address conversion using a conversion table for conversion of an uppermost order value in said time domain information in said first address and the value of said second address.

11. The recording and/or reproducing method according to claim 10 wherein said first address has four time units of hour (H), minute (M), second (S) and frame (F) as address values, and wherein said address converting step effects address conversion using a conversion table for conversion between the value of the hour (H) as the uppermost order time unit in said first address and the value of said second address.

12. The recording and/or reproducing method according to claim 10 wherein, said address converting step converts the value of the second address recorded in a pre-groove formed along the recording track of said optical recording medium into the value of the first address;

said recording and/or reproducing step records information signals using the first address as converted in said address converting step.

13. The recording and/or reproducing method according to claim 10 wherein said address conversion step converts the second address input from a host device into the first address;

said recording and/or reproducing step locates the logical track based on the result of comparison between the first address converted by said address conversion step and the address of the logical track contained in table-of-contents information recorded in the lead-in area of said optical recording medium.

14. The recording and/or reproducing method according to claim 10 further comprising, at a pre-stage of said address converting step, a step of discriminating a standardized first optical recording medium and a second optical recording medium which achieves high recording density as it is rendered convertible with said first optical recording medium;

said address converting step executing address conversion, using said conversion table, responsive to the result of discrimination by said discriminating means.

* * * * *